May 30, 1972     YOH-HAN PAO     3,666,351
CONTROLLABLE MAGNETOOPTICAL DEVICES EMPLOYING
MAGNETICALLY ORDERED MATERIALS

Filed Nov. 6, 1969     3 Sheets-Sheet 1

INVENTOR
YOH-HAN PAO

BY Sughrue, Rothwell, Mion, Zinn & Macpeak
ATTORNEYS

United States Patent Office 3,666,351
Patented May 30, 1972

3,666,351
CONTROLLABLE MAGNETOOPTICAL DEVICES EMPLOYING MAGNETICALLY ORDERED MATERIALS
Yoh-Han Pao, Cleveland Heights, Ohio, assignor to The Battelle Development Corporation, Columbus, Ohio
Continuation-in-part of application Ser. No. 746,902, July 23, 1968. This application Nov. 6, 1969, Ser. No. 874,431
Int. Cl. G02f 1/22
U.S. Cl. 350—151       27 Claims

ABSTRACT OF THE DISCLOSURE

A magnetically tunable interference filter including magnetically ordered material and multiple layers for effecting optical interference. Tuning is achieved by causing a change in the index of refraction in the magnetically ordered material. In one embodiments, a magnetically ordered film is sandwiched between two high reflectance mirrors each consisting of alternate films of high and low indices of refraction. The net macroscopic magnetization of the magnetic layer is varied to tune the filter so that it transmits different wavelengths of light in accordance with the magnetization of the film. The magneto optical effect may be varied by means of an external magnetic field which may also be supplemented by an electric field for further control of the magneto-optical effect. (This embodiment may be used as a bidirectional light director.) In a second embodiment, a tunable reflectance filter is formed by alternate films of magnetically ordered and dielectric materials. In a variation of the second embodiment, the alternate films are both of ordered magnetic nature but have different magnetic properties. An external magnetic field is applied to the filter to tune it so that different wavelengths of light are reflected from the filter. Two or more of the filters of the first or second embodiment may be combined in tandem to expand the dynamic range of tuning. In a third embodiment, a dielectric layer is sandwiched between two mirrors of the type used in the second embodiment. When the net macroscopic magnetization of such a filter is changed, the filter acts as a variable band pass filter.

Another embodiment is a light beam scanning or deflecting device incorporating a magnetically ordered medium responsive to a controllable magnetic field.

This application is a continuation-in-part-of application S.N. 746,902, filed July 23,1968 now abandoned.

BAKGROUND OF THE INVENTION

Field of the invention

This invention relates to the field of magnetooptically tunable optical devices and more particularly to magnetically tunable filters employing magnetically ordered layers and multiple layer interference structures.

Devices employing magneto-optical effects such as the Faraday and Cotton-Mouton effects are generally known in the prior art. These devices may be classified into two categories. In one category, the materials used were not of magnetically ordered nature being paramagnetic and diamagnetic in nature and in terms of changes of refractive index, the effect was really very small being of the order of $\Delta n \simeq 10^{-5}$ or less. With these magnitudes, the effects achieved with present devices embodying this invention could not even be contemplated. In the second category where the magneto-optical effect in magnetically ordered materials was used for control of light, the sole interest was directed towards discrimination of polarization. The actual devices utilized Faraday rotation to rotate the plane of polarization of incident polarized light and then depended on analyzers to achieve modulation or isolation. In other instances, the polarization of reflected light was used to detect the state of magnetization of the magnetic material, the practical objective being optical read out of magnetically stored information. In all these cases of the second category, functioning of the devices depended upon discrimination on the basis of polarization. These functions and the method of operation are distinctly different from those of the present devices.

SUMMARY OF THE INVENTION

In contrast to the prior art, the present devices discriminate on the basis of wavelength rather than solely on the basis of polarization. The invention utilizes the change in magnetization of magnetically ordered materials to obtain very large changes in the index of refraction thereof to provide light controlling devices hitherto unavailable. Such devices may operate upon unpolarized light and do not necessarily require polarizers and analyzer which were required in the prior art. More specifically, the devices of one embodiment of this invention utilize the interaction between magnetooptical effects in magnetically ordered materials and the optical interference in thin films to provide magnetically tunable optical devices for operating upon electromagnetic radiation in the optical range, i.e., ultra-violet to far infrared. More specifically, this embodiment relates to magnetically tunable multifilm optical interference filters for selectively transmitting or reflecting light of a desired wavelength from a polychromatic light beam incident upon the filter and also to such filters which function as light switches with respect to an incident monochromatic light beam. In another embodiment, a magnetically ordered medium responsive to a controllable external magnetic field for a device for scanning or deflecting a light beam.

In these devices, either the Faraday or Cotton-Mouton magneto-optical effect is utilized to obtain large changes in the index of refraction. In devices according to the invention, the change of index of refraction realized by the change in magnetization can be as large as 0.1.

DESCRIPTION OF THE PREFERRED EMBODIMENTS

Figure 1:
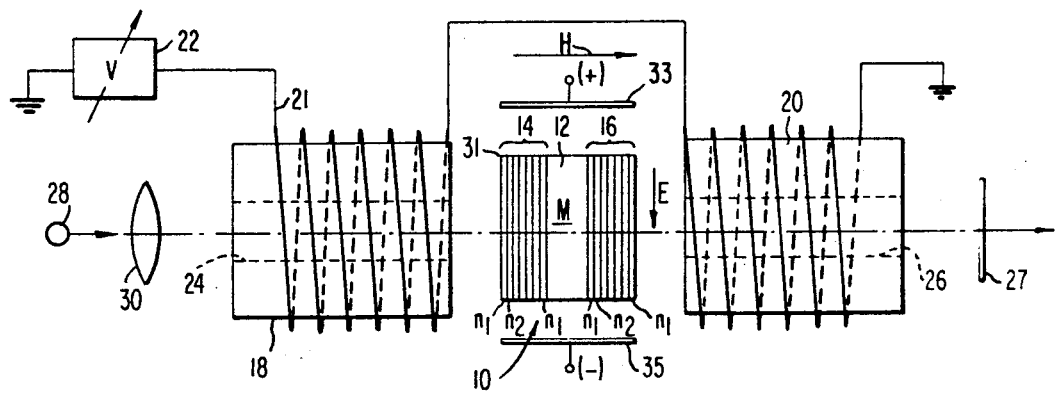
FIG. 1 is a schematic diagram of a magnetically tunable interferences transmission filter embodying the invention.

In the context of the invention, "magnetically tunable" refers to tuning the devices by varying the magnetization of the material. In magnetically ordered substances, the relative alignment of the electronic spins are determined almost entirely by internal energy considerations rather than by any external field. In the absence of an external field, there is generally no spontaneous net macroscopic magnetization. There are localized magnetically ordered domains which have net magnetization but the domains so orient themselves that these magnetizations cancel out on a macroscopic scale. The external magnetic field merely biases the preferred directions so that a net macroscopic magnetization is obtained. For any specific magnetically ordered material; the observed strengths of the magneto-optic effects depend entirely on how much of the magnetization has been aligned in the desired direction. An external magnetic field is an effective means of influencing the orientation of the magnetic moments, but other means will serve equally well.

This dependence of the strength of the magneto-optic effects on the magnetization has been observed in many instances and is generally accepted in this field. As the magnetization saturates, so does the magneto-optic effect regardless of whether the external field is increased further.

In this connection, it will be helpful to make a few remarks concerning the quantum mechanical nature of the magneto-optic effects, not only to explain the basic dependence on the magnetization, but also to indicate why the Cotton-Mouton effect need not be small in magnetically ordered substances relative to the Faraday effect. In fact these names have been used here and in other sections of this discussion in deference to customary usage, but the nature of their origins can be quite different in magnetically ordered substances, as compared with paramagnetic or diamagnetic substances. Eventually, it may be desirable to refer to these effects as linear magnetic birefringence and circular magnetic birefringence, respectively, to avoid association with behaviour in non-magnetically ordered materials.

Let us consider a crystal made of atoms and/or ions of certain species which initially have unpaired electrons. This is to say, if each atom were to be isolated, it would have a net spin magnetic moment regardless of its orbital magnetic moment. The question of considerable interest is then under what circumstances would the substance be magnetically ordered, and, furthermore, even if a magnetic state is attained, whether the spins would all align themselves in parallel manner to yield ferromagnetism and/or would alternate directions be preferred to yield antiferromagnetism or ferrimagnetism in the case of two or more sublattices.

The questions are not completely answered and the available answers are not universally accepted, the latter being especially true of metal magnetics where the details of the role played by the so-called "itinerant electrons" are still considered a controversial matter. However, in non-conducting substances there is less controversy and there is more or less general acceptance of the qualitative nature of our understanding of the phenomena.

In all cases the essential questions are the origin and the magnitude of the exchange energy. Of interest to the present discussion is the fact that the Pauli exclusion principle and the antisymmetric nature of the electronic wavefunction results in many-electron states with parallel spins and antiparallel spins having possibly very different energies. This has nothing to do with spin-spin or spin orbit coupling. Just coulombic interaction and the antisymmetric nature of the many electronic wavefunctions is sufficient to do this. The difference in energy between the two states is the exchange energy. The details of this purely quantum mechanical effect is beyond the scope of this discussion. Therefore, we will not discuss the differences between direct exchange, super exchange, indirect exchange and itinerant exchange. What we need to note is primarily that once the state is magnetically ordered, not only the direction of the (spin) magnetization is determined, but also the orbital part of the wavefunctions are determined and reflect the fact that the substance has a sense to it. Under such conditions, there is no plane of symmetry for the crystal and the response to right handed and left handed circularly polarized light are different. This is always true of small domains of magnetically ordered material. However, in a macroscopic crystal in the absence of an external field, these domains are generally randomly oriented and no net magneto-optic effect is then observed. The effect of the external magnetic field is to bias the orientation of the spins so that the orbital parts of the wavefunction all know a common "sense" or direction and therefore contribute constructively to the magneto-optic effect.

The Faraday rotation can then be understood in terms of the magnetically ordered substance having different refractive indices for right and left handed circularly polarized light. Of course, there is also dispersion of refractive index with wavelength.

Consequently, since there is a direction associated with the macroscopic magnetization and since the electron wavefunctions may be profoundly affected by the direction of the spins (due to the Pauli exclusion principle), it is not difficult to see that in the Cotton-Mouton configuration there really is no basic reason to expect the refractive indices for the two normal modes to be identical. All indications are that this linear magnetic birefringence is almost as large as the circular one and in some instances saturates at lower fields.

Examples of transparent magnetically ordered materials to be used include sodium iron fluoride ($Na_5Fe_3F_{14}$), $RbNiF_3$ and $RbFeF_3$, $CrBr_3$, Yttrium Iron garnet (YIG) and EuSe. The first three materials are ferrimagnetic and have Curie temperatures above 100° K. Both $RbNiF_3$ and $RbFeF_3$ saturate at rather low fields and have relatively small Cotton-Mouton and Faraday effects. Both $CrBr_3$ and EuSe have very large Faraday rotations ($10^5$°/cm.), and EuSe also has a large measured Cotton-Mouton phase difference. However, EuSe also has a low Curie temperature (7° K.). YIG is ferrimagnetic up to nearly 500° K. depending upon impurities present, if any.

In this connection, it should be pointed out that in some metals and semiconductors a somewhat different type of magnetic ordering is obtained in the presence of an applied magnetic field. In contrast to the ordering of spin moments, the ordering in this latter case is an ordering of orbital moments. The electrons of interest are almost "free" in the sense that their mean free paths are microscopic rather than atomic or molecular in dimensions. Speaking classically, these electrons travel in circular orbits in the presence of an applied magnetic field. As they absorb energy from the field, the radius of the motion increases until a collision occurs and the orbit collapses. The procedure then starts again. The classical picture does not provide a correct description of how these orbital motions are "ordered," and it is known that the quantum mechanical description in terms of "Landau states" or magnetically ordered states does provide an adequate description. Again, the material responds differently to left-handed circularly polarized and right-handed circularly polarized light, and there are two refractive index dispersion curves displaced relative to each other by a frequency shift corresponding to the cyclotron resonance energy. This type of effect is insignificantly small in materials such as organic compounds where electrons are tightly bound spatially. In appropriate crystals both interband and intraband transitions may give rise to this pheonomenon, and typical materials of interest are lightly doped germanium (Ge), indium antimonide (InSb), gallium arsenide (GaAs), indium arsenide (InAs) and other semiconductors with high mobility.

The listed materials are only exemplary, and it is recognized that other suitable magnetically ordered transparent materials may be used. What is of importance is the state of magnetization. Therefore, our present devices would include all variations in which the magneto-optical effect is varied not directly by a magnetic field but rather indirectly, for example, by means of an electric field or an acoustic field.

The magnetically tunable interference filters of the invention depend upon both interference phenomena and magneto-optical effects. The combined uses of these two types of phenomena result in optical components with new and interesting properties.

In all of the devices considered here, some or all of the materials employed in the construction of the device are magnetic in nature and are also substantially transparent in the wavelength region of interest.

For the purposes of the present discussion, the filters may be classified into two types depending on whether the Cotton-Mouton effect or the Faraday effect is used. However, in both cases the principal physical parameter of interest is the phase difference between the normal modes of light. In the Faraday effect, this phase difference manifests itself as the angle of rotation in degrees per cm. While in the Cotton-Mouton effect it is conventionally directly reported as such.

In both cases it is helpful to characterize the phenomena in terms of a difference of refractive index for the two modes, the difference being due to the presence of the magnetic field.

That is, we write:

$$\frac{360 \Delta n}{\lambda} = \theta = \text{phase difference in degrees per cm.}$$

Then if $\theta = 2 \times 10^5 °/\text{cm.}$ for $\lambda = 5 \times 10^{-5}$ cms., then $$\Delta n = \frac{2 \times 10^5 \times 5 \times 10^{-5}}{360} = \frac{1}{36} \sim 0.028$$

For the Faraday effect this means that the refractive indices of the circularly polarized modes are $n_0 \pm 0.014$ respectively. However, in the Cotton-Mouton configuration most of the changes is manifest in one of the two normal modes.

Using these numbers and assuming that the refractive index of the material is about 1.5, we see that the essence of the magneto-optical phenomenon of interest can be thought of as being an induced change of refractive index which may be of the order of a few percent. This may be compared favorably with prior art electro-optic effects. It is known, for example, that $\Delta n$ in a KDP crystal is of the order of $10^{-5}$ for applied electric fields of the order of $10^6$ volts per meter.

All the devices considered here have the common feature that they include transparent magnetic materials which, when subjected to an externally applied magnetic field, exhibit large changes of refractive index, the changes varying from a fraction of a percent to a few percent. Another common feature is that randomly polarized light may be used in all cases. Consequently, all of the devices and applications considered here are distinctly different from the Faraday rotators and gyrators of the prior art where polarized light is used and the basic response of interest is the rotation of the plane of polarization. Consequently, prior art devices employing the magneto-optic effect have depended on the use of polarized light and rotation of the plane of polarization. A typical patent of this type is U.S. Pat. No. 3,245,314— "Optical Rotation Devices Employing a Ferromagnetic Chromium Trihalide"—which teaches specifically how the rotation of the plane of polarization of plane polarized light may be used in combination with polarizers and analyzers to achieve light modulation and/or isolation. In contrast the devices of the present invention: (1) operate equally well on randomly polarized light; and (2) discriminate on the basis of wavelength rather than polarization; or (3) perform functions not taught in the prior art relating to Faraday effect devices.

Furthermore, it is also recognized that in some instances prior patents dealing with the art of electro-optic devices have casually mentioned that similar devices might be made using magneto-optics. Such an assumption is incorrect since electro-optic materials are usually not magneto-optic, and furthermore, means for applying an electro-optic field do not teach what the magneto-optic configuration should be or indeed could be. As an example, whe consider U.S. Pat. No. 2,960,914 for an "Electro-Optical Light Switch." This patent discloses an electro-optical light switch employing transparent electrodes and materials such as cryolite and zinc sulfide. However, this patent does not teach what magnetic materials might be used or what the magneto-optical configuration might be, and furthermore, the largest changes of refractive index possible in the case of cryolite and zinc sulfide are of the order of only $10^{-6}$ to $10^{-5}$ at breakdown voltages. In comparison the magneto-optic devices of this invention, with attainable changes of about $10^{-2}$ in refractive index, have a dynamic range ten thousand times larger than that of such an electro-optic device.

Therefore, it can be seen that the magneteo-optic devices embodying the present invention are clearly novel in view of the prior art of magneto-optic and electro-optic devices as just described.

There are of course, many applications for media whose refractive index can be changed by controlling the magnetization. These consist for example of devices which operate upon and control incident electromagnetic radiation. These may be for example, light beam reflectors, frequency modulators, variable focal length lenses and other optical elements.

FIG. 1 illustrates a magnetically tunable multiple film optical interference transmission filter 10. The filter itself consists of a central film 12 of magnetically ordered material. This film has a thickness of $nd = m\lambda/2$ where $n$ is the index of refraction of the film, $d$ is the thickness of the film, $\lambda$ is the light wavelength of interest and $m$ is any positive integer. Fixed to opposite surfaces of the film 12 are a pair of multifilm interference mirrors 14 and 16, each mirror consisting of an odd dielectric film having alternate indices of refraction $n_1$ and $n_2$ where $n_1$ is larger than $n_2$. The outer dielectric film of each mirror and the dielectric film adjacent the film 12 has the higher index of refraction $n_1$. However, these multifilm dielectric mirrors may be replaced by any two partially transmitting high reflectance mirrors. Interference effects and selective transmissivity are still retained.

Such a filter will transmit light having a wavelength $\lambda = 2nd/m$ when the filter is in its unexcited or natural state. However, according to the invention, the filter may be magento-optically excited in order to change the index of refraction of the magnetic film 12 so that the filter may be tuned i.e., selected different wavelengths of light may be transmitted through the filter to the exclusion of other wavelengths. To accomplish this result, an external magnetic field is applied to the filter by an electromagnet schematically shown by a pair of pole pieces 18 and 20 on which is wound a winding 21. A source of variable voltage 22 is connected across the winding to produce a magnetic field H in the direction illustrated. Pole pieces 18 and 20 contain light passages 24 and 26, respectively. Polychromatic light from a source 28 is collimated by a lens 30 and directed through passage 24 to be normally incident on the outer film 31 of filter 10. When the field H is changed the net macroscopic magnetization of film 12 is changed to thereby change its index of refraction, whereby the wavelength of the light transmitted through the filter 10 is varied in accordance with the change of the index of refraction. The use of electromagnets with poles is merely exemplary. The magnetic field may also be generated in air coils, in microwave cavities or by other means.

The parameters of interest are the spectral range of the device, the width of the pass band and the dynamic (or tuning) range of the device. Spectral range is the wavelength interval between pass bands corresponding to the different orders of interference. The width of the pass band is determined by the reflectance of the mirrors and the dynamic range is determined by $\Delta n$.

To obtain some idea of the numbers involved, let the zero field refractive index $n_0$ of the magnetic layer 12 be 1.5, and let the filter be made to transmit at $\nu = 5 \times 10^{14}$ cps.; that is, let $\lambda_{vacuum}$ be 6,000 A. so that $\lambda_{material\ 12}$ is 4,000 A.

To secure a large spectral range, we take the thickness of the layer 12 equal to 2,000 A., that is, $$nd = \lambda/2\ vacuum$$

The spectral range of the device is then $$\Delta\nu = \frac{C}{2n_0 d} = \frac{3 \times 10^{10}}{4 \times 10^{-5}} = 7.5 \times 10^{14}$$

and there is therefore no other transmission band in the visible wavelength region.

The dynamic or tuning range is given by $$D(\nu) = \frac{\Delta n}{n_0} \times 5 \times 10^{14}$$

For ferromagnetic materials $\Delta n$ may be as large as $10^{-2}$ for moderate magnetic fields (e.g. 5 kilogauss) and $D(\nu)$ may be as large as $10^{13}$ cps. or 330 cm.$^{-1}$.

The width of the pass band or the smallest resolvable frequency interval is determined by the reflectivity of the layers or coatings forming the mirrors. For an effective reflectance R of 0.995, the smallest resolvable interval would be $$\delta\nu = \frac{(1-R^2)}{4} \frac{C}{2nd} \simeq 1.82 \times 10^{12}\ cps.$$

Since $D(\nu) > \delta\nu$, this tunable filter is of interest.

Of course, we can easily decrease the width of the pass band by increasing the thickness of the central layer 12. For example, if the central layer is taken to be 4 microns thick, then the spectral range is $$\Delta\nu = \frac{C}{2nd} = 2.5 \times 10^{13}\ cps.$$

the pass band width is $$\delta\nu = \frac{(1-R^2)}{4}(2.5 \times 10^{13}) = 6.25 \times 10^{10}\ cps.$$

and the dynamic or tuning range may still be as large as $10^{13}$ cps.

Another combination of interest can be obtained with ferrimagnetic materials such as rubidium iron or nickel fluorides. These materials have $\Delta n$ of only about $10^{-4}$ but compensate for this by having rather high Curie temperatures (above 100° K.) and low saturation fields ($\simeq$250 gauss).

Therefore, using fields of a few hundred gauss we can obtain $\Delta n$ of about $10^{-4}$. This means that for $\lambda_{vac.} = 6,000$ A. and $n = 1.5$, and a film thickness of 40 microns, the spectral range and pass band width would be approximately $3 \times 10^{12}$ cps. and $7.5 \times 10^9$ cps. respectively, but the tuning range would be $5 \times 10^{10}$. This combination of numbers would be useful for the modulation of relatively narrow band light.

In all cases, both normal modes are transmitted or reflected but they would be at different frequencies. If only one mode is desired, the other one may be blocked off with an analyzer 27.

In a variation of the FIG. 1 embodiment, the magnetic field H may be used to bias the magnetization of the filter to a certain degree. Then, a variable electric field E may be applied to the filter to tune or modulate the filter further. The electric field changes the magneto-optical effect and may be used in all the embodiments of the invention. Furthermore, the electric field may have components parallel and orthogonal to the path of the light being controlled. For example the electric field may be applied by electrodes 33 and 35 connected to a suitable voltage source. Other fields such as acoustical may also be used for this type of further control.

Insofar as the mirrors used are lossless, then all radiation which is within the spectral range and is not transmitted is necessarily reflected. Such tunable reflectance is also considered to be within the scope of this invention.

Figure 2:
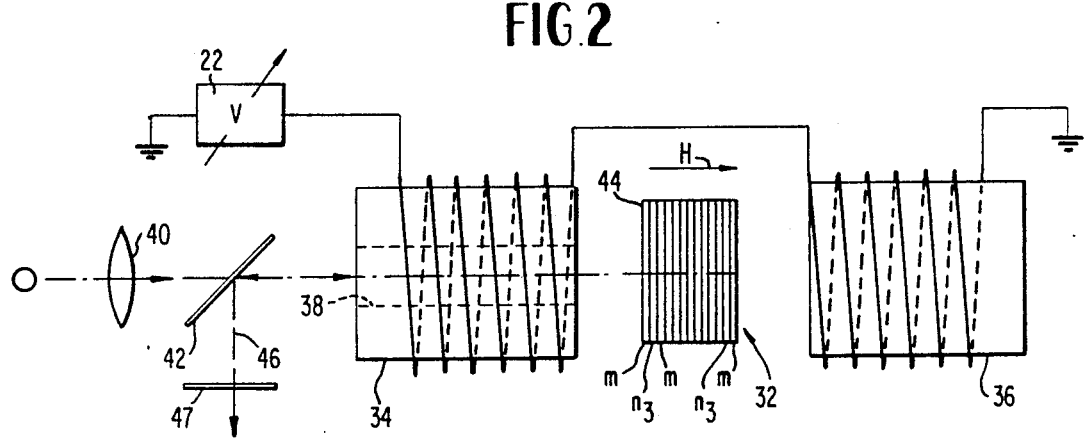
FIG. 2 is a schematic diagram of a magnetically tuned interence reflectance filter embodying the invention.

FIG. 2 schematically illustrates a reflectance filter embodying the invention. In this case, a filter 32 consists of an odd number (13) of films of alternately dielectric material and magnetically ordered material with the two outer films being magnetically ordered material. The magnetically ordered material is labeled M and the dielectric material is labeled $n_3$. The refractive index of the magnetic material may be greater or less than that of the dielectric and either of the two materials may be on the outside. Once again an external magnetic field is applied in the direction H by an electromagnet represented by the pole pieces 34 and 36 which are identical to pole pieces 18 and 20 with the exception that even though pole piece 34 contains a passage 38, no corresponding passage is required in pole piece 36.

Polychromatic light is collimated by a lens 40 and passed through a beam splitter 42 and passage 38 so that it is normally incident upon the outer magnetic film 44. In its unexcited state, the interference mirror formed by the films will reflect light of a particular wavelength back through passage 38 where it is reflected upwardly from splitter 42 as represented by the beam 46. In accordance with the invention, when the net macroscopic magnetization of the magnetic film is varied, the index of refraction of the filter 32 will be changed so that the wavelength of the reflected light beam 46 will also be changed in accordance with the variation of the index of refraction, thereby providing a tunable reflectance filter. Again, an analyzer 47 may be used to remove one of the reflected modes.

Again insofar as the filter is lossless, all radiation which is within the spectral range and is not reflected is necessarily transmitted. Such tunable transmissivity is also considered to be within the scope of this invention.

Figure 3:
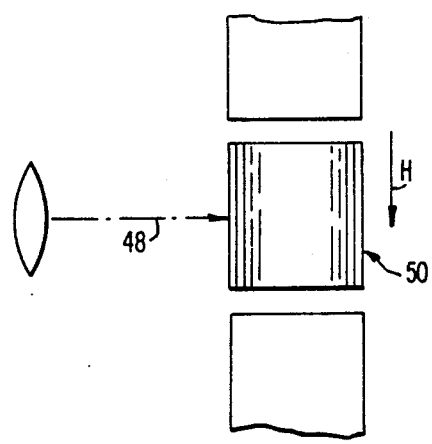
FIG. 3 is a schematic diagram illustrating a variation of the embodiments illustrated in FIGS. 1 and 2.

FIG. 3 is a schematic representation of variations of the embodiments shown in both FIGS. 1 and 2. The magnetic field H in the case is orthogonal to the light path 48. Even though a different form of magnetooptical effect is utilized in the FIG. 3 embodiment, the operation of the device operates on a similar principle i.e., the external magnetic field causes a change in the net macroscopic magnetization of the filter 50, thereby changing the index of refraction of the magnetically ordered material in the filter so that the wavelength of light transmitted or reflected by the filter can be varied. Whether the filter 50 functions as a transmission filter or as a reflectance filter depends upon whether the filter 16 of FIG. 1 or the filter 32 of FIG. 2 is used as the filter 50.

Figure 4:
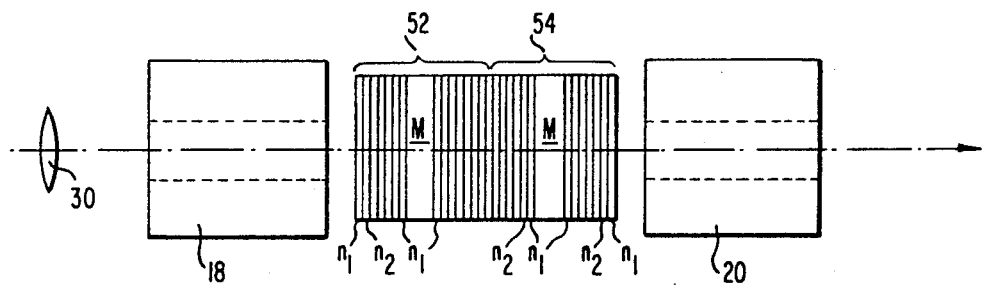
FIG. 4 is a schematic diagram illustrating another variation of the embodiment of FIG. 1.

FIG. 4 schematically illustrates a variation of the invention which may be applied to each of the embodiments illustrated in FIGS. 1-3. The dynamic tuning range of these devices may be expanded by placing two or more of the filters in tandem as illustrated in FIG. 4. FIG. 4 illustrates, as an example, a variation of the embodiment of FIG. 1 in which two transmission filters 52 and 54 are disposed in tandem in the path of the light from lens 30. Each of the filters 52 and 54 is identical to the transmission filter 12 illustrated in FIG. 1 except that the tuning ranges are adjacent to each other and the reflectance band of the mirrors of the one filter does not block the transmission range of the other.

Figure 5:
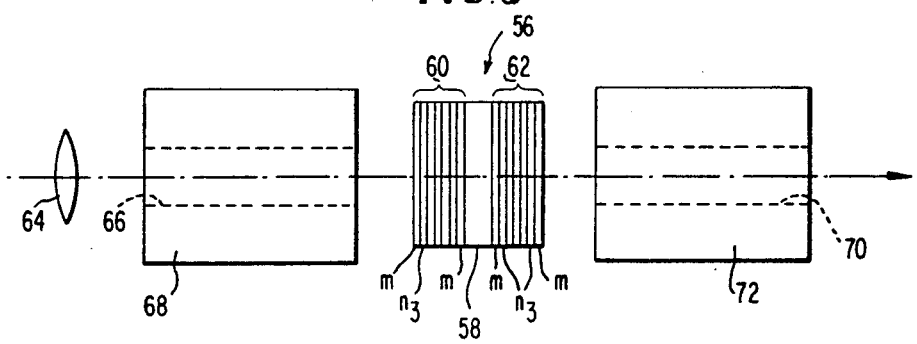
FIG. 5 is a schematic diagram of monochromatic light switch embodying the invention.

FIG. 5 illustrates another embodiment of the invention employing the same principle of operation as described with respect to the previous embodiments to provide a monochromatic light switch. Here, a filter 56 consists of a central dielectric film 58 having mounted on its opposite faces multifilm interference mirrors 60 and 62. These mirrors are similar in construction to the mirrors 32 in that the films are alternately magnetic material and dielectric material. As illustrated the outer films on each mirror are magnetic material, and the mirror film adjacent the dielectric film 58 is also magnetic material. However, an odd number of films is used in each of the mirrors and either of the two materials may be on the outside.

Figure 6:
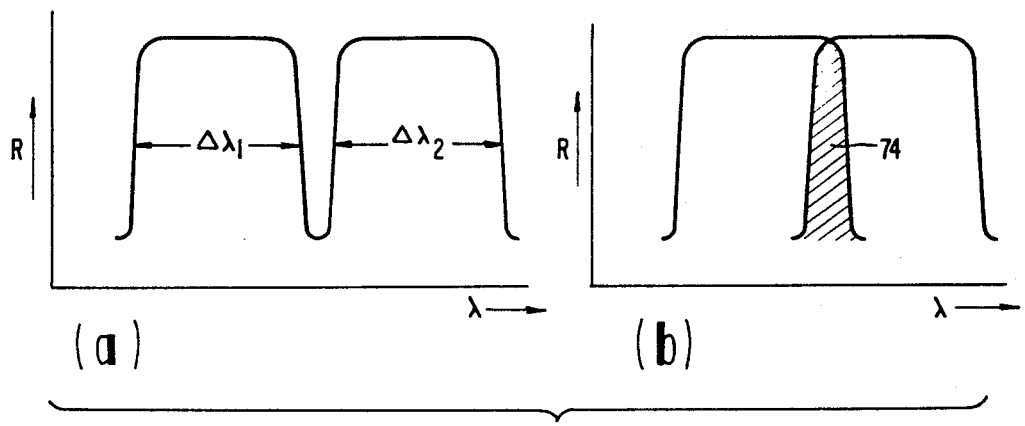
FIGS. 6a and 6b are curves illustrating the operation of the embodiment of FIG. 5.

As illustrated in FIG. 6a, in its unexcited state, the filter 56 acts as a selective reflective filter having two reflectance bands Δλ1 and Δλ2. In FIGS. 6a and 6b, the letter r represents the reflectance of the filter. However, when the net macroscopic magnetization of the magnetic films is changed, the index of refraction thereof is changed to convert the filter to a transmission filter. In this embodiment, monochromatic light is collimated by the lens 64 and passes through a passage 66 in the pole piece 68.

It is assumed that the incident wavelength of the monochromatic light is between the reflectance bands of the filter 56 and thereby is transmitted through the filter to the passage 70 in pole piece 72. However, the net macroscopic magnetization of the magnetic layers in the mirrors 60 and 62 may be changed to change the index of refraction of the magnetic films, thereby preventing the monochromatic light from passing through the filter. This result is represented schematically in FIG. 6b which shows that the change in magnetization can be controlled in such a manner that the reflectance bands overlap to prevent the light from passing therethrough. In other words, FIG. 5 illustrates a magnetically controllable light valve for monochromatic light, since in the unexcited state the light is totally transmitted or, whereas in the magnetically excited state, the light is reflected or blocked by the filter. As discussed previously in connection with the FIG. 1 embodiment, an electric field may also be used for further control of the magneto-optical effect.

Both the FIG. 1 and FIG. 5 embodiments of this invention may be used as bi-directional light directors allowing monochromatic light to be transmitted in one direction in the transmitting state and reflecting the light beam in another direction in the nontransmitting but reflection state. For example in FIG. 1, if the light from source 28 were monochromatic, it would be reflected back through passage 24 in one state of the filter. But when the filter is tuned to the transmitting state, the light beam is transmitted through passage 26.

The tunable filters may be used for spectroscopic applications, high speed light switches, light modulators, laser Q switches, optical read out for magnetic memories, optical display systems and in other applications of this nature.

Figure 7:
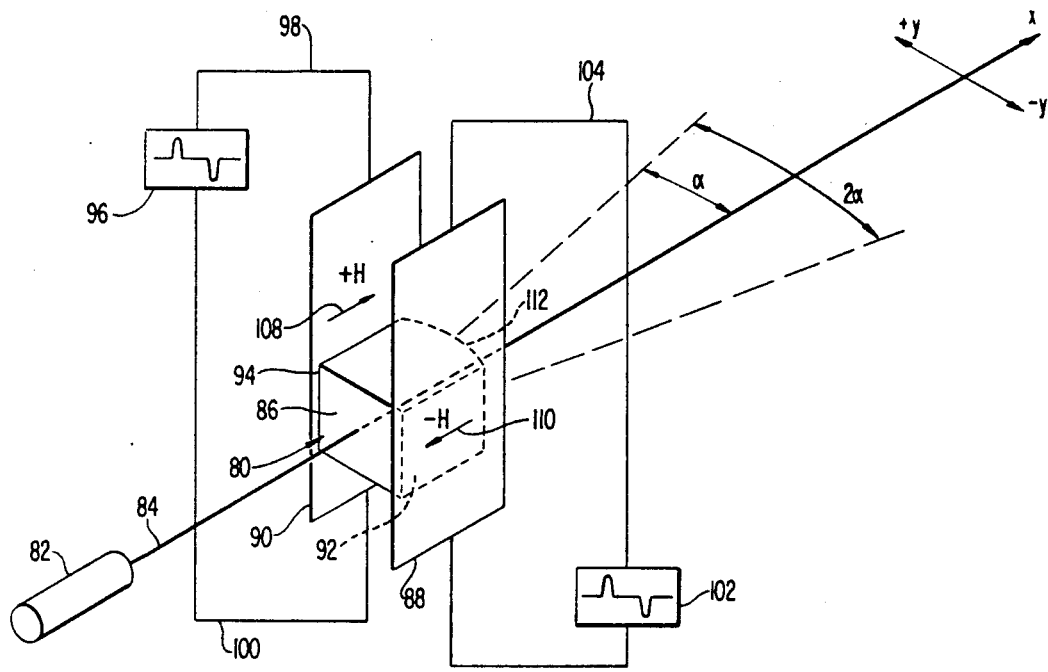
FIG. 7 is a schematic diagram of a light beam deflecting device embodying the invention.

FIG. 7 is a schematic diagram of a light scanner or beam deflector embodying the invention.

It is known that a beam of light passing through a non-uniform medium will not travel in a straight line but will bend or deflect in the direction in which the refractive index increases. Thus, when one attempts to direct a search light or a laser beam more or less towards the horizon, there is a measurable dip in the beam due to the temperature gradient and resulting refractive index gradient in the earth's atmosphere. The extent to which the beam is deflected depends upon the magnitude of the gradient of the refractive index and the length of travel through the medium, i.e., the earth's atmosphere. An analog of this type of behavior may be achieved in transparent magnetically ordered materials and may be used to provide the large angle, high resolution light scanning or beam deflecting devices of this invention. In such devices, as an externally applied magnetic field is varied, there is induced in the magnetically ordered material a refractive index gradient which varies with the magnetic field so that a light beam traveling through the material is deflected by different amounts to produce rapid, large angle scanning of the beam, which scanning may be used in protoprinting applications, visual displays, optical character recognition systems, and optical information storage and retrieval systems.

A preferred embodiment of such a light scanning or beam deflecting device is illustrated in FIG. 7. The device includes a transparent, magnetically ordered medium in the form of an element 80. A light source 82 directs a light beam 84 onto the face 86 of element 80. The light beam may be unpolarized light, including randomly polarized light. The beam may also be plane polarized, but it is to be understood that the beam need not be plane polarized in order to produce the beam deflection or scanning in accordance with the principles of the invention. A pair of electric current conductors, such as conductive strips 88 and 90, are disposed adjacent the opposite faces 92 and 94, respectively, of the magnetically ordered element 80, these faces being perpendicular to face 86 and parallel to the direction of the input light beam 84.

A pulse generator 96 is connected across strip 90 by means of leads 98 and 100. Similarly, a pulse generator 102 is connected across strip 88 by means of leads 104 and 106. The generators produce periodic pulses alternating in polarity. The generators are synchronized so that their outputs have the same polarity.

With such an arrangement, a positive pulse from generator 96 will produce in the portion of the element 89 immediately adjacent strip 90 a maximum magnetic field $+H$ in the direction indicated by the arrow 108. In like manner, a simultaneously occurring positive pulse from generator 102 will produce in the portion of element 80 immediately adjacent strip 88 a maximum magnetic field $-H$ in the direction indicated by the arrow 110. Consequently, there is developed across the opposite faces 92 and 94 of element 80 a magnetic potential gradient of 2H. When the pulses from generators 96 and 102 are both negative, the directions of the magnetic fields represented by arrows 108 and 110 are reversed. The direction of the magnetic gradient is also reversed, but its maximum magnitude is still 2H. As the refractive index of element 80 is reversed in direction by the reversing magnetic field gradient produced by the alternately positive and negative pulses produced by generators 96 and 102, beam 84 is corresponding scanned or deflected back and forth as described in more detail below.

Figure 8:
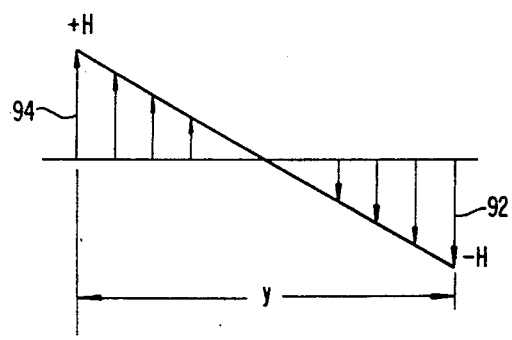
FIG. 8 is a diagram illustrating the magnetic field gradient in the device of FIG. 7.

The currents flowing through the strips 88 and 90 produce in element 80 inhomogeneous magnetic fields which oppose each other in the region of the element 80 to produce the magnetic field gradient as illustrated in FIG. 8 for the case when generators 96 and 102 are both producing positive pulses. Where the magnetic fields produced by both strips are equal and opposite, the magnetic fields cancel in the center of element 80 and are each equal to a maximum field H in opposite directions on the opposite faces 92 and 94, thereby providing across the element in the direction $y$ a magnetic gradient or magnetic potential difference of 2H. Of course, one of the pulse generators may be eliminated but in that case the net magnetic gradient potential difference would be only H. Alternatively four such strips and generators may be used to produce the same effect but with improved constancy in the gradient.

Assuming that the $x$ axis represents the undeflected path of the beam 84 through element 80 when there is no magnetic field present, and $y$ represents the direction perpendicular to $x$ through which the light beam 84 is deflected from the $x$ axis upon a change of refractive index in element 80 as induced by the externally applied magnetic field gradient, then the instantaneous rate of displacement from the original direction $x$ of travel of the light beam is given by:

$$\frac{dy}{dx} = \frac{1}{n}\frac{dn}{dy} x \qquad (1)$$

where $n$ is the refractive index of the transparent magnetically ordered material comprising the element 80.

The lateral beam displacement from the $x$ axis in direction $y$ at the exit surface 112 of element 80 is then given by:

$$\frac{1}{2n}\frac{dn}{dy} s^2 \qquad (2)$$

where $s$ is the total path length of the beam in the element 80.

The angle α at which the beam exits from the surface 112 is given by:

$$\alpha = \frac{1}{n}\frac{dn}{dy} \cdot s \quad (3)$$

and the total deflection angle is then equal to 2α.

Consider a gradient of $$\frac{dn}{dy} = \frac{10^{-2}}{10^{-1}} \simeq 10^{-1}$$

and a desired beam deflection of 10°. Then the required path length in centimeters in the active material is found by using the expression:

$$s = \frac{n}{\left(\frac{dn}{dy}\right)} \times \frac{10}{57.3} \simeq \frac{n \times 0.16}{0.1} \simeq 1.6n \quad (4)$$

The lateral displacement in the y direction is then found to be $$\frac{1}{2n} \times 0.1 \times (1.6n)^2 \simeq 0.12n$$

centimeters. Since the transparent magnetically ordered materials comprising element 80 exhibit a refractive index on the order of 1 to 2, the displacement is then about 0.12 cm. and is quite large. On the other hand, if the gradient is of the order of 1, then for a 10° lateral movement, $s = 0.16n$ centimeters, and lateral displacement is found to be .0012n centimeters.

In order to prevent distortion of the beam front due to refraction effects of the exit surface 110, it is desirable to shape that surface according to the equation:

$$x = \rho e^{-2\beta|y|} \quad (5)$$

when $$\beta = \frac{1}{n}\frac{dn}{dy}$$

and e denotes the exponential function and |y| represents the absolute value of y. For sufficiently small lateral displacements it may be approximated by the first few terms of a power series expansion.

Randomly polarized light may be used in the beam deflecting device illustrated in FIG. 7. However, depending upon the configuration used, such a device may also be used to resolve randomly polarized light into its constituent normal modes and deflect these modes by different amounts.

In one form of the device illustrated in FIG. 1, material of element 80 is lightly doped germanium, and the light beam 84 is nearly monochromatic at about 1.6 microns wide band infrared radiation in the 10 micron region. This material and choice of wavelengths are only examples and other combinations of materials and wavelengths may be used. However, generally speaking, monochromatic sources should be used with interband effects, because the dispersion of Δn with wavelength is very large there, and the device is most effective with narrow band radiation near the band edge. On the other hand, Δn due to intraband or "free carrier" transitions, varies very slowly with wavelength and wide band infrared sources may then be used.

A very effective beam deflecting device according to this invention may also be obtained with the element 80 and the magnetic field generating means all contained in a cryostat operating, for example, below 20° K. Under such circumstances, superconducting elements may be used to produce very large magnetic fields, and low temperature active materials, such as EuO or CrBr$_3$ may be used effectively. A typical field strength for use in the beam deflecting device of this invention when the material comprising element 80 is EuO or germanium is one kilogauss per millimeter of thickness of the element 80 in the y direction.

As stated above, when the arrangement of the two pulse generators 96 and 102 is used as illustrated in FIG. 7, the pulse generators should be synchronized so that pulses of the same polarity coincide in time. It should also be understood that the magnetic fields are not required to be produced by pulses, but it is recognized that larger currents can be tolerated by the use of pulses as compared to the use of continuous currents.

I claim:
1. A tunable filter for electromagnetic radiation incident upon said filter comprising:
   (a) a magnetically ordered medium,
   (b) first and second partially transmitting mirrors on opposite sides of said medium, whereby a change in net magnetization of said medium causes a change in the index of refraction of said medium to change the bands of radiation transmittable and reflectable by said filter; and
   (c) means for applying a magnetic field to said medium to produce said change in net magnetization.
2. A tunable filter as defined in claim 1 wherein said electromagnetic radiation is light.
3. A tunable filter as defined in claim 1 wherein said medium exhibits a relatively large magneto-optical effect, and means for applying a variable magnetic field to said medium for changing said net magnetization.
4. A tunable filter as defined in claim 3 further comprising means for applying a variable electric field to said medium for additionally changing the index of refraction of said medium.
5. A tunable filter as defined in claim 1 wherein each of said mirrors contains an odd number of dielectric layers with adjacent layers having different indices of refraction.
6. A tunable filter as defined in claim 1 further comprising means for blocking one of the two modes of polarization of light transmitted through said filter.
7. A tunable filter as defined in claim 1 wherein said magnetically ordered medium comprises a transparent semiconductor with high mobility.
8. A tunable filter as defined in claim 7 wherein said transparent semiconductor is chosen from the group consisting of lightly doped germanium, indium antimonide, gallium arsenide and indium arsenide.
9. A tunable filter for electromagnetic radiation comprising:
   (a) an interference mirror including alternate layers of magnetically ordered and dielectric material, whereby a change in the net magnetization of said magnetically ordered layers causes a change in the index of refraction of said magnetically ordered material to change the bands of radiation transmittable and reflectable by said filter, and
   (b) means for applying a magnetic field to said magnetically ordered layers to produce said change in net magnetization.
10. A tunable filter as defined in claim 9 wherein said electromagnetic radiation is light.
11. A tunable filter as defined in claim 9 further comprising means for applying to said filter a variable magnetic field to cause said change in net magnetization.
12. A tunable filter as defined in claim 11 further comprising means for applying a variable electric field to said medium for additionally changing the index of refraction of said medium.
13. A tunable filter as defined in claim 9 further comprising means for blocking one of the two modes of polarization of light reflected by said filter.
14. A tunable filter as defined in claim 9 wherein said alternate layers of magnetically ordered material comprise a transparent semiconductor with high mobility.
15. A wide range tunable filter for selectively transmitting different bands of electromagnetic radiation incident upon said filter comprising:
   (a) a first filter portion including
       (1) a first magnetically ordered medium, and
       (2) first and second partially transmissive mirrors on opposite sides of said first medium,

(b) a second filter portion in tandem with said first filter portion and including
  (1) a second magnetically ordered medium, and
  (2) third and fourth partially transmissive mirrors on opposite sides of said second medium, wherein the tuning ranges of said filter portions are adjacent each other, and the reflectance band of the mirrors of one filter portion does not block the transmission range of the other, whereby a change in net magnetization of the magnetically ordered media causes a change in the index of refraction of said media to change the band of radiation transmittable by said filter, and 16. A wide range tunable filter as defined in claim 15 wherein said first and second magnetically ordered media comprise a transparent semiconductor with high mobility.

17. A wide range tunable filter for selectively reflecting different bands of electromagnetic radiation comprising:
  (a) a first interference mirror including alternate layers of magnetically ordered and dielectric material,
  (b) a second interference mirror in tandem with said first mirror and including alternate layers of magnetically ordered and dielectric material, the tuning ranges of said mirrors being adjacent each other, whereby a change in the net magnetization of such magnetically ordered layers causes a change in the index of refraction of said magnetically ordered medium to change the band of radiation reflected by said filter, and
  (c) means for applying a magnetic field to said magnetically ordered layers to produce said change in net magnetization.

18. A wide range tunable filter as defined in claim 17 wherein said alternate layers of magnetically ordered material comprise a transparent semiconductor with high mobility.

19. A magnetically controlled electromagnetic radiation switch for selectively passing and blocking a desired wavelength of electromagnetic radiation, comprising:
  (a) a dielectric medium,
  (b) interference mirrors on opposite sides of said medium, said interference mirrors each consisting of laternate layers of magnetically ordered and dielectric material, whereby said switch in its unexcited state blocks said desired wavelength of light, and
  (c) means for exciting siad switch by applying a magnetic field thereto so that said desired wavelength passes through said switch.

20. A magnetically controlled electromagnetic radiation switch as defined in claim 19, wherein said alternate layers of magnetically ordered material comprise a transparent semiconductor with high mobility.

21. A variable refractive index element operating upon unpolarized electromagnetic radiation in the light range comprising:
  (a) a magnetically ordered medium transparent to said radiation, and
  (b) means for establising a magnetic field gradient in said medium to induce therein a spatially constant refractive index gradient in a direction perpendicular to the direction of propagation of the radiation whereby the operation of said element is independent of the polarization of said radiation.

22. An element as defined in claim 21 further comprising means for applying an electric field to said medium for additionally changing its refractive index.

23. A variable refractive index element as defined in claim 2 wherein said medium comprises a transparent semiconductor with high mobility.

24. A variable refractive index element as defined in claim 23 wherein said transparent semiconductor is chosen from the group consisting of lightly doped germanium, indium antimonide, gallium arsenide and indium arsenide.

25. A light beam deflecting device comprising:
  (a) a transparent magnetically ordered medium, and
  (b) means for establishing a mangetic field gradient in said medium to induce therein a spatially constant refractive index gradient in a direction perpendicular to the direction of propagation of the light beam, whereby a light beam traveling through said medium is deflected in the direction of increasing refractive index of said medium.

26. A light beam deflecting device as defined in claim 25 further comprising means for periodically reversing the polarity of the magnetic field gradient, thereby periodically reversing the direction of increasing refractive index of said medium to periodically reverse the direction of deflection of said light beam.

27. A light beam deflecting device as defined in claim 26 wherein said periodically reversing means comprises:
  (a) current conducting means adjacent said magnetically ordered medium, and
  (b) electric pulse generating means connected to said current conducting means for producing said magnetic field gradient.

References Cited

UNITED STATES PATENTS

| | | | |
|---|---|---|---|
| 3,164,665 | 1/1965 | Stello | 350—160 |
| 3,166,673 | 1/1965 | Vickery et al. | 350—151 UX |
| 3,439,974 | 4/1969 | Henry et al. | 350—149 |
| 3,279,317 | 10/1966 | Ploke | 350—166 X |
| 3,272,988 | 9/1966 | Bloom et al. | 350—151 X |
| 3,492,061 | 1/1970 | Dillon, Jr., et al. | 350—DIG 2 |

OTHER REFERENCES

Argyle et al., "Eu Se Light Switch" IBM Tech Discl. Bull. vol. 8, No. 3 (August, 1965) pp. 437–438.

Erlbach, "Infrared Modulator Using Dichroic Circular Polarizer" IBM Tech. Discl. Bull. vol. 6, No. 10 (March, 1964) pp. 106–107.

MacDonald et al., "Magneto-Optic Element" IBM Tech. Discl. Bull. vol. 9, No. 12 (May, 1967) pp. 1753–1754)

DAVID SCHONBERG, Primary Examiner

P. R. MILLER, Assistant Examiner

U.S. Cl. X.R.

350—149, 150, DIG. 2